United States Patent
Sollami

(10) Patent No.: US 10,968,738 B1
(45) Date of Patent: Apr. 6, 2021

(54) REMANUFACTURED CONICAL BIT

(71) Applicant: Phillip Sollami, Herrin, IL (US)

(72) Inventor: Phillip Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 0 days.

(21) Appl. No.: 15/927,795

(22) Filed: Mar. 21, 2018

Related U.S. Application Data

(60) Provisional application No. 62/476,194, filed on Mar. 24, 2017.

(51) Int. Cl.
*E21C 35/18* (2006.01)
*B23K 20/12* (2006.01)
*B23K 101/00* (2006.01)

(52) U.S. Cl.
CPC .............. *E21C 35/18* (2013.01); *B23K 20/12* (2013.01); *B23K 2101/002* (2018.08)

(58) Field of Classification Search
CPC .... E21C 35/18; B23K 20/12; B23K 2101/002
See application file for complete search history.

(56) References Cited

U.S. PATENT DOCUMENTS

| | | |
|---|---|---|
| 2,382,947 A | 7/1944 | Brozek |
| 3,342,532 A | 9/1967 | Krekeler |
| 3,397,012 A | 8/1968 | Krekeler |
| 3,476,438 A | 11/1969 | Bower, Jr. |
| 3,519,309 A | 7/1970 | Engle |
| 3,833,264 A | 9/1974 | Elders |
| 3,833,265 A | 9/1974 | Elders |
| 3,853,258 A * | 12/1974 | Louw ............. B23K 20/12 228/2.3 |
| 3,865,437 A | 2/1975 | Crosby |
| 4,084,856 A | 4/1978 | Emmerich |
| 4,247,150 A | 1/1981 | Wrulich et al. |
| RE30,807 E | 12/1981 | Elders |
| 4,310,939 A | 1/1982 | Iijima |
| 4,453,775 A | 6/1984 | Clemmow |
| 4,478,298 A | 10/1984 | Hake |
| 4,489,986 A | 12/1984 | Dziak |
| 4,525,178 A | 6/1985 | Hall |
| 4,561,698 A | 12/1985 | Beebe |
| 4,570,726 A | 2/1986 | Hall |
| 4,604,106 A | 8/1986 | Hall |

(Continued)

FOREIGN PATENT DOCUMENTS

| | | |
|---|---|---|
| DE | 102004049710 | 4/2006 |
| DE | 102011079115 | 1/2013 |

(Continued)

*Primary Examiner* — Moshe Wilensky
(74) *Attorney, Agent, or Firm* — Mercedes V. O'Connor; Rockman Videbeck & O'Connor

(57) ABSTRACT

A bit that includes reclaiming a substantially solid body from a consumed conical bit. The substantially solid body includes a truncated forward body portion where the destroyed bit was removed and a generally cylindrical shank portion depending axially from the forward body portion. A new forward portion that includes a generally cylindrical bore or a tapered bore axially extending from a forward end of the forward portion is welded to an interface of the truncated forward body portion of the substantially solid body.

15 Claims, 4 Drawing Sheets

(56) References Cited

U.S. PATENT DOCUMENTS

| | | |
|---|---|---|
| 4,632,463 A | 12/1986 | Sterwerf, Jr. |
| 4,694,918 A | 9/1987 | Hall |
| 4,702,525 A | 10/1987 | Sollami |
| 4,763,956 A | 8/1988 | Emmerich |
| 4,811,801 A | 3/1989 | Salesky |
| 4,818,027 A | 4/1989 | Simon |
| 4,821,819 A | 4/1989 | Whysong |
| 4,844,550 A | 7/1989 | Beebe |
| 4,915,455 A | 4/1990 | O'Niell |
| 4,944,559 A | 7/1990 | Sionett |
| 5,067,775 A | 11/1991 | D'Angelo |
| 5,088,797 A | 2/1992 | O'Neill |
| 5,098,167 A | 3/1992 | Latham |
| 5,159,233 A | 10/1992 | Sponseller |
| 5,161,627 A | 11/1992 | Burkett |
| 5,273,343 A | 12/1993 | Ojanen |
| 5,287,937 A | 2/1994 | Sollami |
| 5,302,005 A | 4/1994 | O'Neill |
| 5,303,984 A | 4/1994 | Ojanen |
| 5,352,079 A | 10/1994 | Croskey |
| 5,370,448 A | 12/1994 | Sterwert, Jr. |
| 5,374,111 A | 12/1994 | Den Besten |
| 5,415,462 A | 5/1995 | Massa |
| 5,417,475 A | 5/1995 | Graham et al. |
| 5,458,210 A | 10/1995 | Sollami |
| 5,484,191 A | 1/1996 | Sollami |
| 5,492,188 A | 2/1996 | Smith et al. |
| 5,551,760 A | 9/1996 | Sollami |
| 5,607,206 A | 3/1997 | Siddle |
| 5,628,549 A | 5/1997 | Ritchey |
| 5,720,528 A | 2/1998 | Ritchey |
| 5,725,283 A | 3/1998 | O'Neill |
| 5,823,632 A | 10/1998 | Burkett |
| 5,924,501 A | 7/1999 | Tibbitts |
| 5,931,542 A | 8/1999 | Britzke |
| 5,934,854 A | 8/1999 | Krautkremer et al. |
| 5,992,405 A | 11/1999 | Sollami |
| D420,013 S | 2/2000 | Warren |
| 6,019,434 A | 2/2000 | Emmerich |
| 6,102,486 A | 8/2000 | Briese |
| 6,176,552 B1 | 1/2001 | Topka, Jr. |
| 6,196,340 B1 | 3/2001 | Jensen et al. |
| 6,199,451 B1 | 3/2001 | Sollami |
| 6,250,535 B1 | 6/2001 | Sollami |
| 6,331,035 B1 | 12/2001 | Montgomery, Jr. |
| 6,341,823 B1 | 1/2002 | Sollami |
| 6,357,832 B1 | 3/2002 | Sollami |
| 6,371,567 B1 | 4/2002 | Sollami |
| 6,382,733 B1 | 5/2002 | Parrott |
| 6,428,110 B1 | 8/2002 | Ritchey et al. |
| 6,508,516 B1 | 1/2003 | Kammerer |
| D471,211 S | 3/2003 | Sollami |
| 6,585,326 B2 | 7/2003 | Sollami |
| 6,685,273 B1 | 2/2004 | Sollami |
| 6,692,083 B2 | 2/2004 | Latham |
| D488,170 S | 4/2004 | Sollami |
| 6,733,087 B2 | 5/2004 | Hall |
| 6,739,327 B2 | 5/2004 | Sollami |
| 6,786,557 B2 | 9/2004 | Montgomery |
| 6,824,225 B2 | 11/2004 | Stiffer |
| 6,846,045 B2 | 1/2005 | Sollami |
| 6,854,810 B2 | 2/2005 | Montgomery |
| 6,866,343 B2 | 3/2005 | Holl et al. |
| 6,968,912 B2 | 11/2005 | Sollami |
| 6,994,404 B1 | 2/2006 | Sollami |
| 7,097,258 B2 | 8/2006 | Sollami |
| 7,118,181 B2 | 10/2006 | Frear |
| 7,150,505 B2 | 12/2006 | Sollami |
| 7,195,321 B1 | 3/2007 | Sollami |
| 7,210,744 B2 | 5/2007 | Montgomery |
| 7,229,136 B2 | 6/2007 | Sollami |
| 7,234,782 B2 | 6/2007 | Stehney |
| D554,162 S | 10/2007 | Hall |
| 7,320,505 B1 | 1/2008 | Hall |
| 7,338,135 B1 | 3/2008 | Hall |
| 7,347,292 B1 | 3/2008 | Hall |
| D566,137 S | 4/2008 | Hall |
| 7,353,893 B1 | 4/2008 | Hall |
| 7,384,105 B2 | 6/2008 | Hall |
| 7,396,086 B1 | 6/2008 | Hall |
| 7,401,862 B2 | 7/2008 | Holl et al. |
| 7,401,863 B2 | 7/2008 | Hall |
| 7,410,221 B2 | 8/2008 | Hall |
| 7,413,256 B2 | 8/2008 | Hall |
| 7,413,258 B2 | 8/2008 | Hall |
| 7,419,224 B2 | 9/2008 | Hall |
| 7,445,294 B2 | 11/2008 | Hall |
| D581,952 S | 12/2008 | Hall |
| 7,464,993 B2 | 12/2008 | Hall |
| 7,469,756 B2 | 12/2008 | Hall |
| 7,469,971 B2 | 12/2008 | Hall |
| 7,469,972 B2 | 12/2008 | Hall |
| 7,475,948 B2 | 1/2009 | Hall |
| 7,523,794 B2 | 4/2009 | Hall |
| 7,568,770 B2 | 8/2009 | Hall |
| 7,569,249 B2 | 8/2009 | Hall |
| 7,571,782 B2 | 8/2009 | Hall |
| 7,575,425 B2 | 8/2009 | Hall |
| 7,588,102 B2 | 9/2009 | Hall |
| 7,594,703 B2 | 9/2009 | Hall |
| 7,600,544 B1 | 10/2009 | Sollami |
| 7,600,823 B2 | 10/2009 | Hall |
| 7,628,233 B1 | 12/2009 | Hall |
| 7,635,168 B2 | 12/2009 | Hall |
| 7,637,574 B2 | 12/2009 | Hall |
| 7,648,210 B2 | 1/2010 | Hall |
| 7,665,552 B2 | 2/2010 | Hall |
| 7,669,938 B2 | 3/2010 | Hall |
| 7,681,338 B2 | 3/2010 | Hall |
| 7,712,693 B2 | 5/2010 | Hall |
| 7,717,365 B2 | 5/2010 | Hall |
| 7,722,127 B2 | 5/2010 | Hall |
| 7,789,468 B2 | 9/2010 | Sollami |
| 7,832,808 B2 | 11/2010 | Hall |
| 7,883,155 B2 | 2/2011 | Sollami |
| 7,950,745 B2 | 5/2011 | Sollami |
| 7,963,617 B2 | 6/2011 | Hall |
| 3,007,049 A1 | 8/2011 | Fader |
| 7,992,944 B2 | 8/2011 | Hall |
| 7,992,945 B2 | 8/2011 | Hall |
| 7,997,660 B2 | 8/2011 | Monyak et al. |
| 7,997,661 B2 | 8/2011 | Hall |
| 8,007,051 B2 | 8/2011 | Hall |
| 8,029,068 B2 | 10/2011 | Hall |
| 8,033,615 B2 | 10/2011 | Hall |
| 8,033,616 B2 * | 10/2011 | Hall ............... E21B 10/36 299/113 |
| 8,038,223 B2 | 10/2011 | Hall |
| 8,061,784 B2 | 11/2011 | Hall |
| 8,109,349 B2 | 2/2012 | Hall |
| 8,118,371 B2 | 2/2012 | Hall |
| 8,136,887 B2 | 3/2012 | Hall |
| 8,201,892 B2 | 6/2012 | Hall |
| 8,215,420 B2 | 7/2012 | Hall |
| 8,292,372 B2 | 10/2012 | Hall |
| 8,414,085 B2 | 4/2013 | Hall |
| 8,449,039 B2 | 5/2013 | Hall |
| 8,485,609 B2 | 7/2013 | Hall |
| 8,500,209 B2 | 8/2013 | Hall |
| 8,540,320 B2 | 9/2013 | Sollami |
| RE44,690 E | 1/2014 | Sollami |
| 8,622,482 B2 | 1/2014 | Sollami |
| 8,622,483 B2 | 1/2014 | Sollami |
| 8,646,848 B2 | 2/2014 | Hall |
| 8,728,382 B2 | 5/2014 | Hall |
| 8,740,314 B2 | 6/2014 | O'Neill |
| 9,004,610 B2 | 4/2015 | Erdmann et al. |
| 9,028,008 B1 | 5/2015 | Bookhamer |
| 9,039,099 B2 | 5/2015 | Sollami |
| 9,316,061 B2 | 4/2016 | Hall |
| 9,518,464 B2 | 12/2016 | Sollami |
| 9,879,531 B2 | 1/2018 | Sollami |
| 9,909,416 B1 | 3/2018 | Sollami |
| 9,976,418 B2 | 5/2018 | Sollami |

(56) References Cited

U.S. PATENT DOCUMENTS

| | | |
|---|---|---|
| 9,988,903 B2 | 6/2018 | Sollami |
| 10,072,501 B2 | 9/2018 | Sollami |
| 10,105,870 B1 | 10/2018 | Sollami |
| 10,107,097 B1 | 10/2018 | Sollami |
| 10,107,098 B2 | 10/2018 | Sollami |
| 10,180,065 B1 | 1/2019 | Sollami |
| 10,260,342 B1 | 4/2019 | Sollami |
| 10,323,515 B1 | 6/2019 | Sollami |
| 10,337,324 B2 | 7/2019 | Sollami |
| 10,370,966 B1 | 8/2019 | Sollami |
| 10,385,689 B1 | 8/2019 | Sollami |
| 10,415,386 B1 | 9/2019 | Sollami |
| 10,502,056 B2 | 12/2019 | Sollami |
| 2002/0074850 A1 | 6/2002 | Montgomery, Jr. |
| 2002/0074851 A1 | 6/2002 | Montgomery, Jr. |
| 2002/0109395 A1 | 8/2002 | Sollami |
| 2002/0167216 A1 | 11/2002 | Sollami |
| 2002/0192025 A1 | 12/2002 | Johnson |
| 2003/0015907 A1 | 1/2003 | Sollami |
| 2003/0047985 A1 | 3/2003 | Stiffler |
| 2003/0052530 A1 | 3/2003 | Sollami |
| 2003/0122414 A1 | 7/2003 | Sollami |
| 2003/0209366 A1 | 11/2003 | McAlvain |
| 2004/0004389 A1 | 1/2004 | Latham |
| 2004/0174065 A1 | 9/2004 | Sollami |
| 2005/0212345 A1 | 9/2005 | Sleep et al. |
| 2006/0071538 A1 | 4/2006 | Sollami |
| 2006/0186724 A1 | 8/2006 | Stehney |
| 2006/0261663 A1 | 11/2006 | Sollami |
| 2007/0013224 A1 | 1/2007 | Stehney |
| 2007/0040442 A1 | 2/2007 | Weaver |
| 2007/0052279 A1 | 3/2007 | Sollami |
| 2008/0035386 A1 | 2/2008 | Hall et al. |
| 2008/0036276 A1 | 2/2008 | Hall et al. |
| 2008/0036283 A1 | 2/2008 | Hall et al. |
| 2008/0100124 A1 | 5/2008 | Hall et al. |
| 2008/0145686 A1 | 6/2008 | Mirchandani |
| 2008/0164747 A1 | 7/2008 | Weaver et al. |
| 2008/0284234 A1 | 11/2008 | Hall et al. |
| 2009/0146491 A1 | 6/2009 | Fader et al. |
| 2009/0160238 A1 | 6/2009 | Hall et al. |
| 2009/0256413 A1 | 10/2009 | Majagi |
| 2009/0261646 A1 | 10/2009 | Ritchie et al. |
| 2010/0045094 A1 | 2/2010 | Sollami |
| 2010/0244545 A1 | 9/2010 | Hall |
| 2010/0253130 A1 | 10/2010 | Sollami |
| 2010/0320003 A1 | 12/2010 | Sollami |
| 2010/0320829 A1 | 12/2010 | Sollami |
| 2011/0006588 A1 | 1/2011 | Monyak et al. |
| 2011/0089747 A1 | 4/2011 | Helsel |
| 2011/0175430 A1 | 7/2011 | Heiderich et al. |
| 2011/0204703 A1 | 8/2011 | Sollami |
| 2011/0254350 A1 | 10/2011 | Hall |
| 2012/0001475 A1 | 1/2012 | Dubay et al. |
| 2012/0027514 A1 | 2/2012 | Hall |
| 2012/0056465 A1 | 3/2012 | Gerer et al. |
| 2012/0068527 A1 | 3/2012 | Erdmann |
| 2012/0104830 A1 | 5/2012 | Monyak et al. |
| 2012/0181845 A1 | 7/2012 | Sollami |
| 2012/0242136 A1 | 9/2012 | Ojanen |
| 2012/0248663 A1 | 10/2012 | Hall |
| 2012/0261977 A1 | 10/2012 | Hall |
| 2012/0280559 A1 | 11/2012 | Watson |
| 2012/0286559 A1 | 11/2012 | Sollami |
| 2012/0319454 A1 | 12/2012 | Swope |
| 2013/0169023 A1 | 7/2013 | Monyak |
| 2013/0181501 A1 | 7/2013 | Hall et al. |
| 2013/0199693 A1 | 8/2013 | Tank et al. |
| 2013/0307316 A1 | 11/2013 | Roetsch et al. |
| 2014/0035346 A1 | 2/2014 | Fundakowski et al. |
| 2014/0110991 A1 | 4/2014 | Sollami |
| 2014/0232172 A1 | 8/2014 | Roth et al. |
| 2014/0262541 A1 | 9/2014 | Parsana et al. |
| 2014/0326516 A1 | 11/2014 | Haugvaldstad |
| 2015/0028656 A1 | 1/2015 | Sollami |
| 2015/0035343 A1 | 2/2015 | Ojanen |
| 2015/0137579 A1 | 5/2015 | Lachmann et al. |
| 2015/0198040 A1 | 7/2015 | Voitic et al. |
| 2015/0240634 A1 | 8/2015 | Sollami |
| 2015/0285074 A1 | 10/2015 | Sollami |
| 2015/0292325 A1 | 10/2015 | Sollami |
| 2015/0300166 A1 | 10/2015 | Ries et al. |
| 2015/0308488 A1 | 10/2015 | Kahl |
| 2015/0315910 A1 | 11/2015 | Sollami |
| 2015/0354285 A1 | 12/2015 | Hall |
| 2016/0039042 A1* | 2/2016 | Riggs .................. B23K 20/129 405/170 |
| 2016/0102550 A1 | 4/2016 | Paros et al. |
| 2016/0194956 A1 | 7/2016 | Sollami |
| 2016/0229084 A1 | 8/2016 | Lehnert |
| 2016/0237818 A1 | 8/2016 | Weber et al. |
| 2017/0089198 A1 | 3/2017 | Sollami |
| 2017/0101867 A1 | 4/2017 | Hall et al. |
| 2017/0157720 A1* | 6/2017 | Sato .......................... B23P 6/04 |

FOREIGN PATENT DOCUMENTS

| | | |
|---|---|---|
| DE | 202012100353 | 6/2013 |
| DE | 102015121953 | 7/2016 |
| DE | 102016118658 | 3/2017 |
| EP | 3214261 | 9/2017 |
| GB | 1114156 | 5/1968 |
| GB | 2483157 | 2/2012 |
| GB | 2534370 | 7/2016 |
| WO | 2008105915 A2 | 9/2008 |
| WO | 2008105915 A3 | 9/2008 |
| WO | 2009006612 | 1/2009 |

* cited by examiner

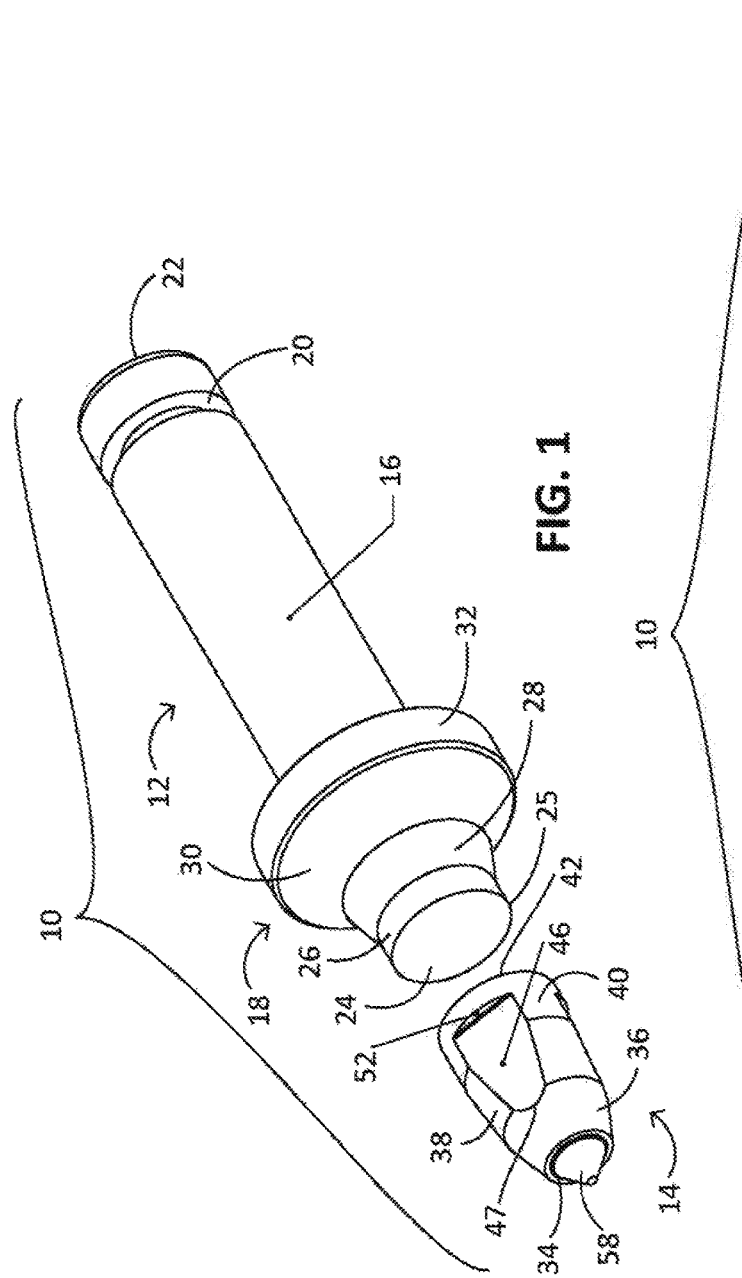
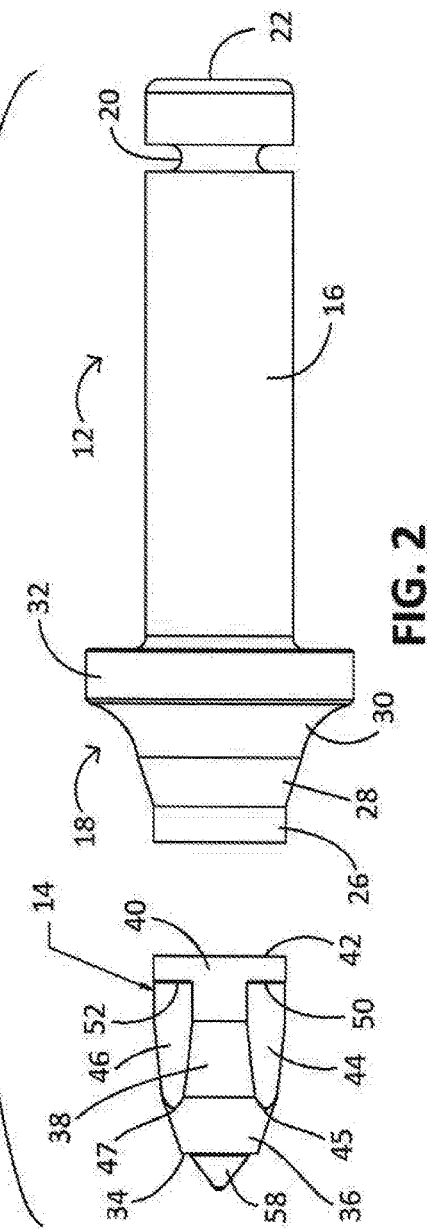
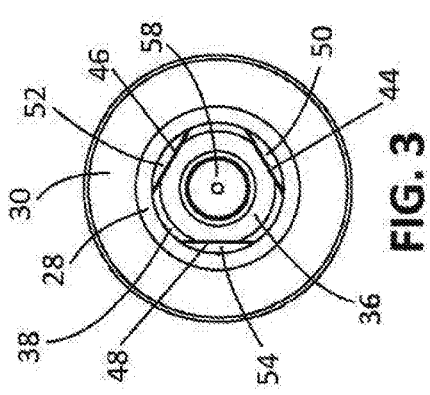
FIG. 1
FIG. 2
FIG. 3

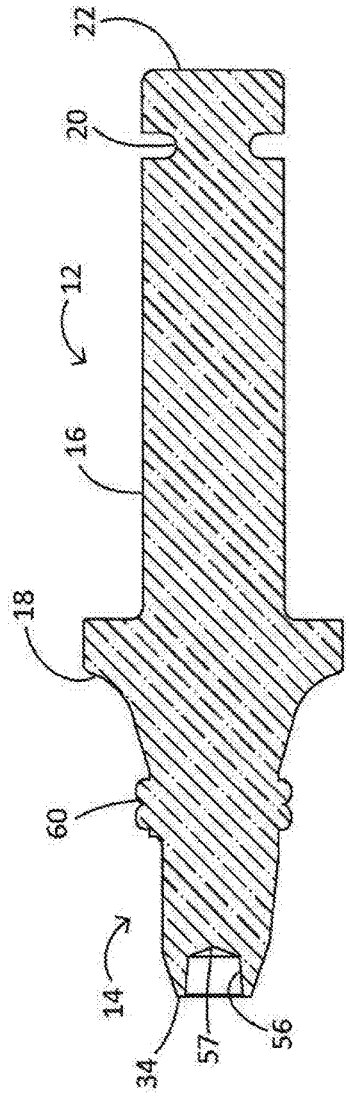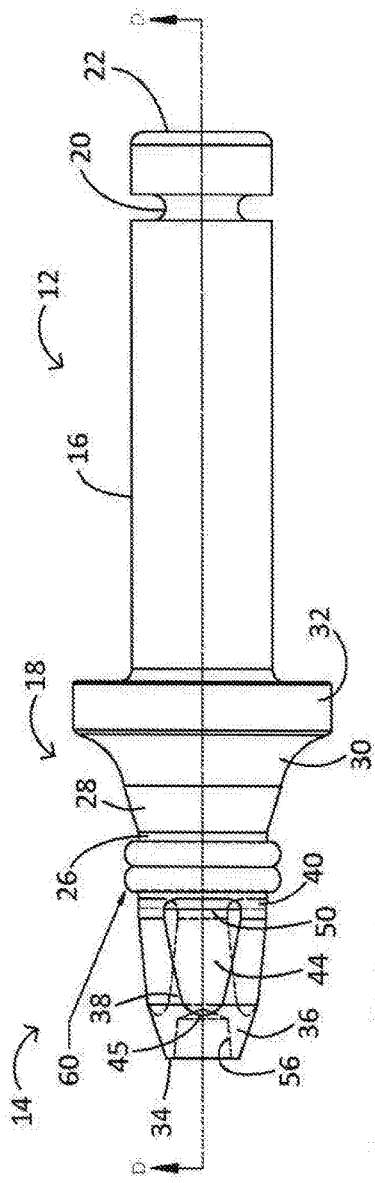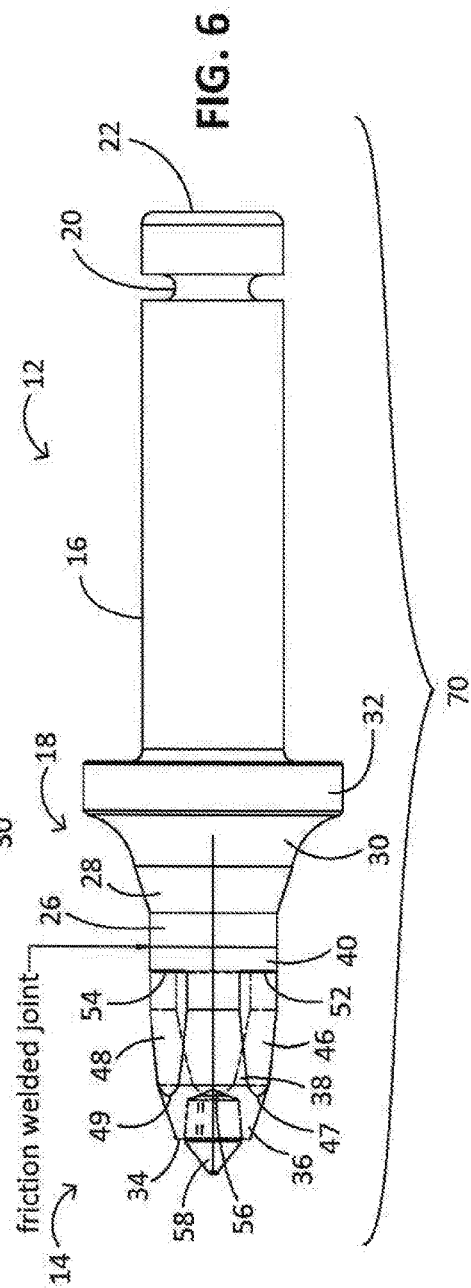

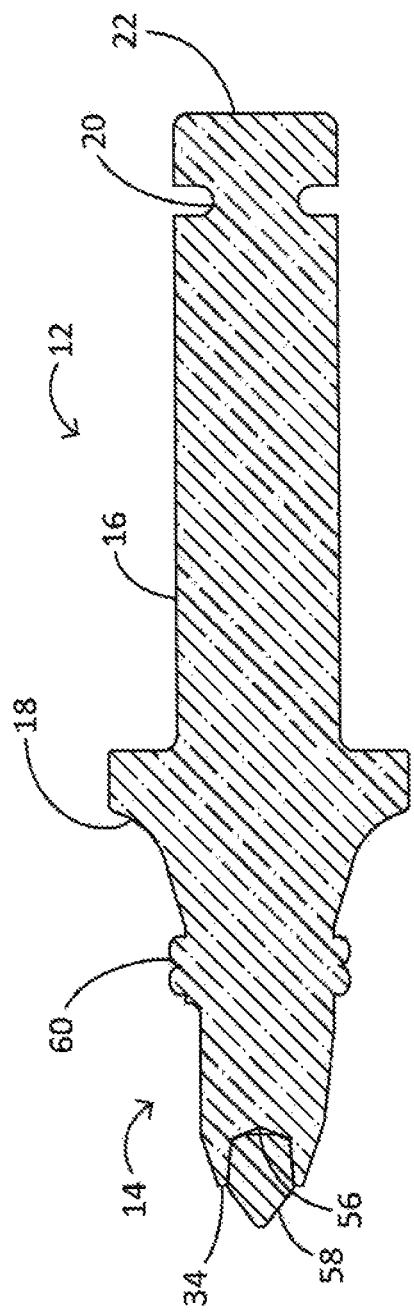
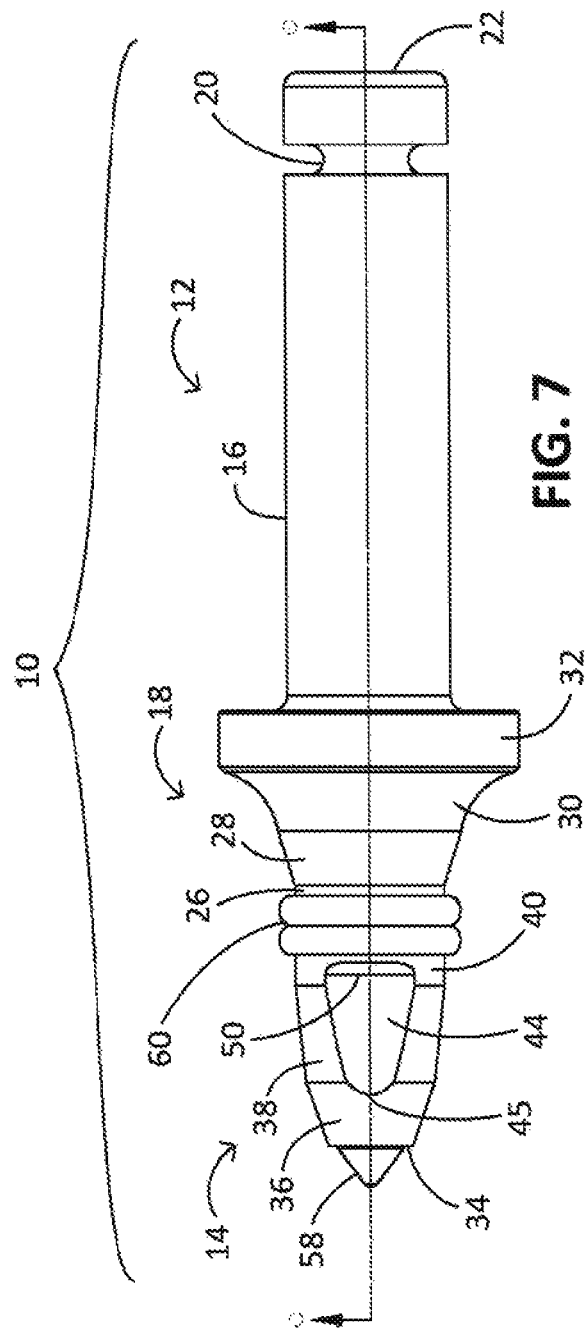

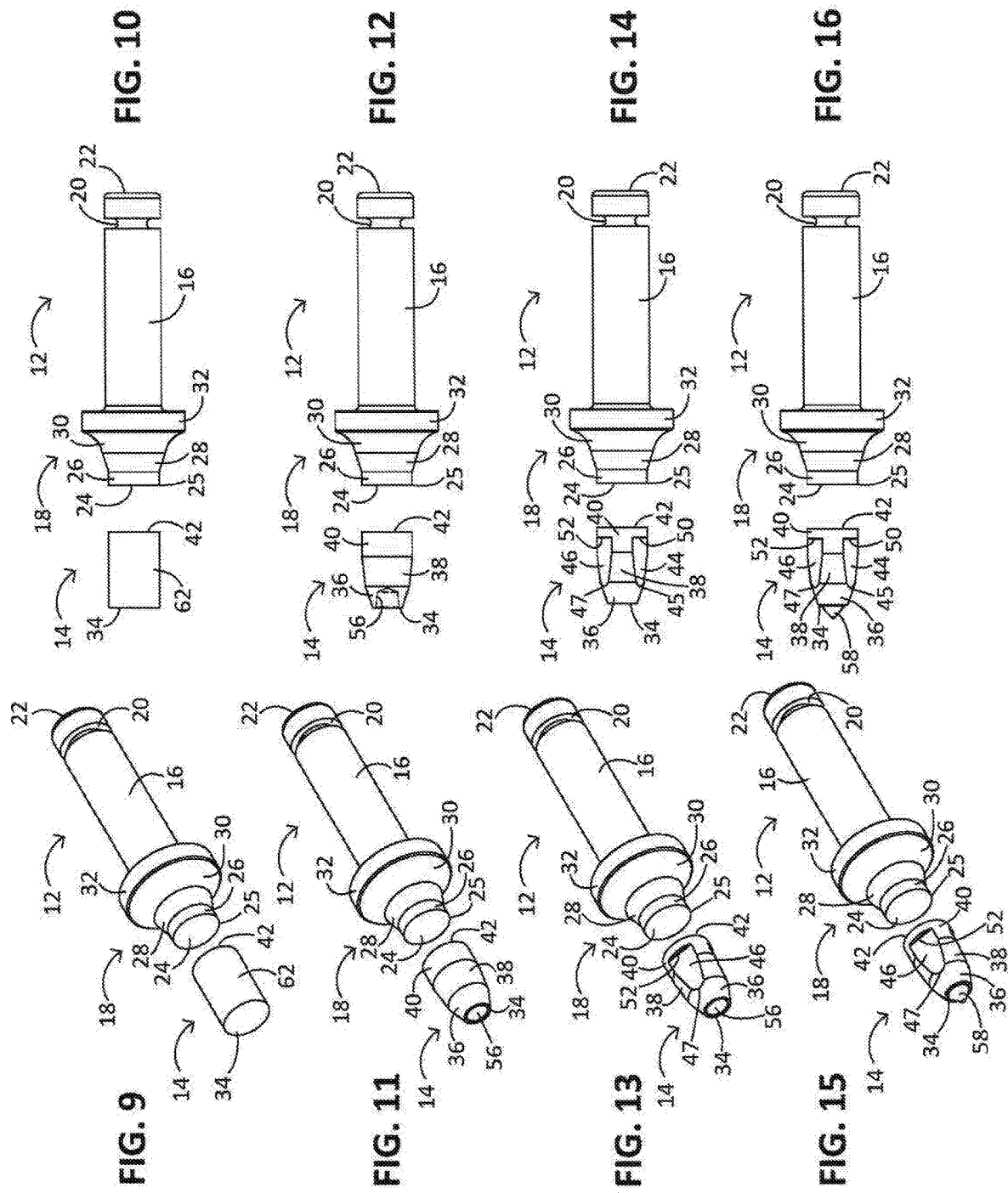

REMANUFACTURED CONICAL BIT

CROSS-REFERENCE TO RELATED APPLICATION(S)

This application claims priority to U.S. Provisional Application No. 62/476,194, filed Mar. 24, 2017, to the extend allowed by law and the contents of which are incorporated herein by reference in their entireties.

TECHNICAL FIELD

This disclosure relates to a point attack bit and method of manufacture for point attack bits used in mining equipment.

BACKGROUND

Mining equipment is operated using a rotatable, cylindrical drum that includes a plurality of bit holder blocks mounted onto the drum in a herringbone, V-shape, or spiral configuration. Bits are traditionally set in a bit assembly that are retained within a bore of the bit holder/bit block. Bit bodies can include a conical cutting tip that is mounted in a recess in a frustoconical forward body portion of the bit body. The cutting tool can include a reclaimed solid generally cylindrical shank that extends axially rearwardly from the forward body portion. The reclaimed shank is obtained from a consumed conical bit body by removing the destroyed front body portion. A new forward body portion is welded onto the reclaimed shank portion via a high strength welding process, such as friction welding and/or inertia welding, thereby eliminating the need to perform any processing on the largest portion of the bit body and saving machining and heat treatment processes. The new forward portion of the bit body can be made of a hardened material and/or can be cold headed, saving costs and providing added strength to the cutting tool. The new forward portion of the bit can be made of any material, including non-sparking or low-sparking material, making the forward body portion adaptable to specific cutting conditions. For example, in some cases the forward body portion can be made suitable for cutting conditions that are more abrasive and require a higher hardness forward portion, while in other cases the forward portion can be made suitable for cutting conditions that contain a gaseous environment and require a non-sparking forward portion.

SUMMARY

This disclosure relates generally to a point attack bit for mining equipment. One implementation of the teachings herein is a cutting bit that includes a substantially solid body comprising a truncated forward body portion and a generally cylindrical shank depending axially from the forward body portion; and a forward portion comprising one of a generally cylindrical and a tapered bore axially extending from a forward end of the forward portion, the forward portion welded to an interface of the substantially solid body.

In another implementation of the teachings herein is a method of manufacturing a bit that includes removing a forward body portion from a consumed bit body, the bit body comprising a truncated forward end including a planar interface and a generally cylindrical shank depending axially from the truncated forward end; attaching the bit body to a rotating chuck device; attaching a new forward portion to a stationary chuck device, the new forward portion comprising at least one generally cylindrical segment adjacent a distal end of the new forward portion, the generally cylindrical segment configured to prevent the new forward portion from rotating; and welding the distal end of the new forward portion to the planar interface of the bit body at a weld joint.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

FIG. 1 is an exploded perspective view of a first embodiment of a conical bit, showing a completed new forward body portion and a reclaimed conical bit body;

FIG. 2 is an exploded side elevation view of the first embodiment of the conical bit, showing a new forward body portion and a reclaimed conical bit body;

FIG. 3 is a top elevation view of the first embodiment of the conical bit of FIG. 2;

FIG. 4 is a cross-sectional side elevation view of the first embodiment of the conical bit, after welding the new forward body portion, without the cutting tip, to the reclaimed conical bit body, shown with extruded flash material formed;

FIG. 5 is a side elevation view of the first embodiment of the conical bit taken along line D-D of FIG. 4;

FIG. 6 is a cross-sectional side elevation view of a second embodiment of a conical bit, after welding the new forward body portion to the reclaimed conical bit body, shown with the extruded flash material removed;

FIG. 7 is a side elevation view of the first embodiment of the conical bit, after welding the new forward body portion to the reclaimed conical bit body, shown with extruded flash material formed;

FIG. 8 is a side elevation view of the first embodiment of the conical bit taken along line C-C of FIG. 7;

FIG. 9 is an exploded perspective view of the first embodiment of the conical bit, showing a cylindrical new forward body portion and a reclaimed conical bit body prior to welding;

FIG. 10 is an exploded side elevation view of the first embodiment of the conical bit, showing a cylindrical new forward body portion and a reclaimed conical bit body prior to welding;

FIG. 11 is an exploded perspective view of the first embodiment of the conical bit, showing a first embodiment of a machined or cold formed new forward body portion and a reclaimed conical bit body prior to welding;

FIG. 12 is an exploded side elevation view of the first embodiment of the conical bit, showing the first embodiment of the machined or cold formed new forward body portion and a reclaimed conical bit body prior to welding;

FIG. 13 is an exploded perspective view of the first embodiment of the conical bit, showing a second embodiment of a machined or cold formed new forward body portion and a reclaimed conical bit body prior to welding;

FIG. 14 is an exploded side elevation view of the first embodiment of the conical bit, showing the second embodiment of a machined or cold formed new forward body portion and a reclaimed conical bit body prior to welding;

FIG. 15 is an exploded perspective view of the first embodiment of the conical bit, showing the second embodiment of a machined and hardened new forward body portion, with a cutting tip brazed thereonto, and reclaimed conical bit body prior to welding; and FIG. 16 is an exploded side elevation view of the first embodiment of the conical bit, showing the second embodiment of a machined and hardened new forward body portion, with a cutting tip brazed thereonto, and reclaimed conical bit body prior to welding.

DETAILED DESCRIPTION

Mining equipment is operated using a rotatable, cylindrical drum that includes a plurality of bit holder blocks mounted onto the drum in a herringbone, V-shape, or spiral configuration. Bits are traditionally set in a bit assembly that are retained within a bore of the bit holder block. Bit bodies can include a conical cutting tip that is mounted in a recess in a frustoconical forward body portion of the bit body. The cutting tool can include a reclaimed solid generally cylindrical shank that extends axially rearwardly from the forward body portion. The reclaimed shank is obtained from a consumed conical bit body by removing the destroyed front body portion. A new forward body portion is welded onto the reclaimed shank portion via a high strength welding process, such as friction welding and/or inertia welding, thereby eliminating the need to perform any processing on the largest portion of the bit body and saving machining and heat treatment processes. The new forward portion of the bit body can be made of a hardened material and/or can be cold headed, saving costs and providing added strength to the cutting tool. The new forward portion of the bit can be made from a range of many hardenable materials, including non-sparking or low-sparking materials, making the forward body portion adaptable to specific cutting conditions. For example, in some cases the forward body portion can be made suitable for cutting conditions that are more abrasive and require a higher hardness forward portion, while in other cases the forward portion can be made suitable for cutting conditions that contain a gaseous environment and require a non-sparking forward portion.

The present disclosure is directed to a new conical bit and a method of manufacture where a consumed conical bit body, having a high initial body cost, is reclaimed and remanufactured into the new conical bit. Generally, only the forward portion of the large bodies are consumed during long wall and continuous mining operations. Long wall mining bits are long enough so that they can be remanufactured by removing the destroyed front portion of the conical bit because the front end is far enough away from the rear end of the consumed conical bit body. The balance of the bit body, including the bit shank, can be used again by removing only the destroyed front portion. The conical bit can then be manufactured using the reclaimed solid generally cylindrical shank portion and welding a new forward portion to the bit body so that the shank extends axially rearwardly from the bit body having the new forward body portion. The new forward body portion is welded onto the reclaimed bit body via a high strength welding process, such as friction welding and/or inertia welding, thereby eliminating the need to perform any processing on the largest portion of the bit body, saving machining and heat treatment processes, resulting in monetary savings of as much as 40% of the original cost of manufacturing a completely new conical bit. The new forward body portion can be welded using a fixed chuck device and a rotating chuck device, which can manually clamp or hydraulically clamp the new forward body portion, or may not have to clamp the new forward body portion at all when the new forward body portion has a plurality of flats.

Referring to FIGS. 1-5, 7 and 8, a first embodiment of a conical bit 10, comprises a reclaimed bit body 12 and a new forward portion 14. Generally, only the forward portion of a conical bit is consumed during mining operations. The reclaimed bit body 12 is recycled into a new conical bit 10 by removing and discarding the destroyed front portion of the consumed conical bits and utilizing the structure of the remaining reclaimed bit body 12 to remanufacture the new conical bit 10. The reclaimed bit body 12 in this illustrated embodiment comprises a generally cylindrical shank 16 that axially depends from the bottom of a forward body portion 18. In this illustrated embodiment, the shank 16 of the reclaimed bit body 12 includes an annular groove 20 adjacent a distal end 22 of the shank 16 and the forward body portion 18 includes an interface 24 (FIGS. 1 and 9-16) at a forward end 25 (FIGS. 1 and 9-16) of the reclaimed bit body 12, opposite the distal end 22, where the old destroyed front portion has been removed. A generally cylindrical upper portion 26 axially extends from the interface 24 (FIGS. 1 and 9-16) to a generally frustoconical first portion 28 (FIGS. 1-4, 6, 7 and 9-16). In this illustrated embodiment, subjacent to the generally frustoconical first portion 28 is a second portion 30 (FIGS. 1-4, 6, 7 and 9-16) that extends axially and radially outwardly to a radially extending generally cylindrical tire portion 32 (FIGS. 1-4, 6, 7 and 9-16). The second portion 30, shown in detail in FIGS. 1-4, 6, 7 and 9-16, has an arcuate shape. In other embodiments, the first portion 28 and/or the second portion 30 can have a frustoconical shape, a convex shape, a concave shape, or an arcuate shape.

The new forward portion 14 can be made from a range of hardenable materials, such as a low-sparking material, such as tungsten carbide, or a non-sparking material. The new forward portion 14 can also be made such that the conical bit 10 has the superior strength, along with extremely good wear resistance, as needed for the mining operation that the conical bit 10 will be used for. The new forward portion 14 initially has a generally cylindrical body 62 (FIGS. 9 and 10). In this embodiment, the new forward portion 14 can be machined or cold formed into a generally frustoconical shape. The generally frustoconical forward portion 14 comprises a tapered first section 36 (FIGS. 1-4, 6, 7 and 11-16) that axially extends from a forward end 34 (FIGS. 1-4, 6, 7 and 9-16) of the forward portion 14. Subjacent to the first section 36 is a tapered second section 38 (FIGS. 1-4, 6, 7 and 11-16) that axially extends to a generally cylindrical third section 40 (FIGS. 1-4, 6, 7 and 11-16) that is adjacent a distal end 42 (FIGS. 1, 2, and 9-16) of the forward portion 14. In other embodiments, the first section 36 and the second section 38 can be tapered, frustoconical, generally cylindrical, or arcuate.

In this exemplary first embodiment of the present disclosure, the forward portion 14 also comprises a plurality of flats 44 (FIGS. 2-4, 7, 14 and 16), 46 (FIGS. 1-3, 6 and 13-16), 48 (FIGS. 3 and 6) that axially extend from a front position 45 (FIGS. 2, 4, 7, 14 and 16), 47 (FIGS. 1, 2, 6 and 13-16), 49 (FIG. 6), respectively, in the first section 36 to a terminal position in the third section 40 adjacent the distal end 42. Each flat 44, 46, 48 terminates at a nearly square shoulder portion 50 (FIGS. 2-4, 7, 14 and 16), 52 (FIGS. 1-3, 6 and 13-16), 54 (FIGS. 3 and 6) adjacent the distal end 42 of the forward portion 14. The plurality of flats 44, 46, 48 can be machined or cold headed in the forward portion 14 prior to welding the forward portion 14 to the reclaimed bit body 12 or subsequent to welding the forward portion 14 to the reclaimed bit body 12.

The forward end 34 of the forward portion 14 includes a generally cylindrical or tapered bore 56 (FIGS. 4-6, 8 and 11-13) positioned centrally therein, including a bore termination 57 (FIG. 5) having a conical shape in this embodiment, into which a conical bit tip 58, shown in FIGS. 1-3, 6-8, 15 and 16, may be positioned and brazed therein. In other embodiments, the bore termination 57 may have a flat shape, or other shape, and the bit tip 58 can have a flat generally cylindrical puck shape (not shown). In this embodiment, the forward portion 14 is made entirely from a non-sparking material while the bit tip 58 is tungsten carbide. The bit tip 58 can be positioned within the bore 56 and brazed to the forward portion 14 before or after the forward portion 14 is heat treated, quenched, and/or welded to the reclaimed bit body 12. The forward portion 14 can be heat treated and/or quenched prior to welding when the bit body 12 was reclaimed from a consumed conical bit that was originally strengthened and hardened using water quench hardening or oil quench hardening. Heat treating and/or quench hardening the forward portion 14 prior to welding reduces costs by reducing the weight of the conical bit 10 that needs to be heat treated and/or quenched, because the reclaimed bit body 12 does not need to be heat treated when it was previously quench hardened.

The new forward portion 14 is welded to the reclaimed bit body 12 via a high strength welding process, such as friction welding, inertia welding, or spin welding. Referring to FIGS. 9-16, the new forward portion 14 can be welded to the reclaimed bit body 12 in several ways, depending on whether the manufacturer wants to machine the new forward portion 14.

As shown in FIGS. 9 and 10, the new forward portion 14 can be welded to the reclaimed bit body 12 in its original generally cylindrical shape 62. The reclaimed bit body 12 is attached to a rotating chuck device and the forward portion 14 is attached to a fixed chuck device that clamps to the generally cylindrical shape 62 to prevent the forward portion 14 from rotating during the friction welding or inertia welding process.

As shown in FIGS. 11 and 12, the new forward portion 14 is machined to include the forward end 34, including the bore 56 axially extending from the forward end 34 to the bore termination 57, the first section 36, the second section 38, the third section 40, and the distal end 42. This minimally machined new forward portion 14 is then welded to the reclaimed bit body 12 by attaching the reclaimed bit body 12 to a rotating chuck device and attaching the forward portion 14 to a fixed chuck device that clamps on to the generally cylindrical third section 40 to prevent the forward portion 14 from rotating during the friction welding or inertia welding process.

As shown in FIGS. 13 and 14, the new forward portion is not only machined to include the forward end 34, including the bore 56 axially extending from the forward end 34 to the bore termination 57, the first section 36, the second section 38, the third section 40, and the distal end 42, but is further machined to include the plurality of flats 44, 46, 48 that axially extend from the front position 45, 47, 49, respectively, in the first section 36 to the terminal position at the nearly square shoulder portion 50, 52, 54 in the third section 40 adjacent the distal end 42. The plurality of flats 44, 46, 48 are necessary when the third section 40 is too short in axial length to be properly gripped by the fixed chuck device to prevent rotation of the new forward portion 14. This machined or cold formed new forward portion 14 is then welded to the reclaimed bit body 12 by attaching the reclaimed bit body 12 to a rotating chuck device and attaching the forward portion 14 to a fixed chuck device that clamps to plurality of flats 44, 46, 48 to prevent the forward portion 14 from rotating during the friction welding or inertia welding process. The square shoulder portions 50, 52, 54 of the plurality of flats 44, 46, 48, respectively, of the forward portion 14 serve as a stop when the forward portion 14 and the reclaimed bit body 12 are forged together. Minimal machining of the new forward portion 14 may be necessary after the welding process.

As shown in FIGS. 15 and 16, the new forward portion 14 may be machined or cold formed to include the forward end 34, including the bore 56 axially extending from the forward end 34 to the bore termination 57, the first section 36, the second section 38, the third section 40, the distal end 42, and the plurality of flats 44, 46, 48 that axially extend from the front position 45, 47, 49, respectively, in the first section 36 to the terminal position at the nearly square shoulder portion 50, 52, 54 in the third section 40 adjacent the distal end 42. The plurality of flats 44, 46, 48 are necessary when the third section 40 is too short in axial length to be properly gripped by the fixed chuck device to prevent rotation of the new forward portion 14. The conical bit tip 58 is also brazed into the bore 56 of the new forward portion 14 prior to welding. This machined new forward portion 14 is then welded to the reclaimed bit body 12 by attaching the reclaimed bit body 12 to a rotating chuck and attaching the forward portion 14 to a fixed chuck device that clamps to plurality of flats 44, 46, 48 to prevent the forward portion 14 from rotating during the friction welding or inertia welding process. The square shoulder portions 50, 52, 54 of the plurality of flats 44, 46, 48, respectively, of the forward portion 14 serve as a stop when the forward portion 14 and the reclaimed bit body 12 are forged together. Minimal, if any, machining of the new forward portion 14 is necessary after the welding process.

Sufficient temperature and/or frictional heat is generated for both materials of the forward portion 14 and/or the reclaimed bit body 12 to become plastic at forging temperature at the distal end 42 of the forward portion 14 and/or the joint interface 24 of the reclaimed bit body 12. Once the rotating chuck device is spinning at the proper speed, the motor is removed and the reclaimed bit body 12 and the forward portion 14 are forced together under pressure. The joining process produces a merging between the materials via the forging heat developed by the induced rubbing motion and the applied load between the distal end 42 of the forward end 14 and the interface 24 of the reclaimed bit body 12. The force is temporarily kept on the reclaimed bit body 12 and the forward portion 14 after the rotation of the reclaimed bit body 12 has stopped to allow the weld to set while the forge pressure is completing the welding process.

During the friction or inertia welding process, forged metal is forced out of the contacting interface, resulting in extruded flash material 60 (FIGS. 4, 5, 7 and 8) formed on the distal end 42 of the forward portion 14 and the forward end 25 of the reclaimed bit body 12. The extruded flash material 60 may be left on the new manufactured conical bit 10, as shown in the first embodiment of the conical bit 10 of FIGS. 4, 5, 7, and 8, to act as a shield and deflect material from the conical bit 10 during use. Alternatively, the extruded flash material 60 may be removed from the new manufactured conical bit 70, as shown in a second embodiment of the conical bit 70 of FIG. 6.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of refurbishing a bit comprising the steps of:
providing a used bit comprising a body portion and a generally cylindrical shank depending axially from the body portion;
removing a forward portion from the body portion of the used bit, the body portion including a first planar interface after the removal of said forward portion;
one of machining and cold heading an outer surface of a truncated forward body portion including a rear second planar interface;
welding the first planar interface of said body portion to said rear second planar interface of the truncated forward body portion;
wherein the step of one of machining and cold heading an outer surface of the truncated forward body portion includes the step of:
forming a plurality of flat surfaces on said outer surface of said truncated forward body portion, said flat surfaces positioned between a forward end of said truncated forward body portion and a back end of said truncated forward body portion; and
wherein the step of forming a plurality of flats includes the step of:
forming a shoulder at a terminal position of each flat surface that is perpendicular to said flat surface extending radially outward to said outer surface.

2. The method of claim 1 before the step of welding, further comprising the step of:
attaching the shank to a rotating chuck; and
attaching the truncated forward body portion to a stationary chuck.

3. The method of claim 2, wherein the stationary chuck clamps to at least one generally cylindrical segment of the truncated forward body portion adjacent the distal end of the truncated forward body portion, the generally cylindrical segment adapted to prevent the truncated forward body portion from rotating.

4. The method of claim 2, wherein the stationary chuck clamps to at least one of the outer surface of the truncated forward body portion and a plurality of planar surfaces of the truncated forward body portion, the plurality of planar surfaces adapted to prevent the truncated forward body portion from rotating.

5. The method of claim 1, further comprising the step of:
forming extruded flash material at the weld joint between the distal end of the second forward body portion and the interface of the truncated forward end.

6. The method of claim 5, wherein the extruded flash material deflects material from the refurbished bit when the refurbished bit is in use.

7. The method of claim 5, further comprising the step of:
removing the extruded flash material from a periphery of the weld joint.

8. The method of claim 1, wherein the second forward body portion is made of one of tungsten carbide and steel.

9. The method of claim 1, wherein the plurality of flat surfaces are axially oriented.

10. The method of claim 1, wherein the outer surface of the truncated forward body portion is one of machined and cold headed prior to welding the first planar interface of said body portion to said rear second planar interface of the truncated forward body portion.

11. The method of claim 1, wherein the outer surface of the truncated forward body portion is one of machined and cold headed after welding the first planar interface of said body portion to said rear second planar interface of the truncated forward body portion.

12. The method of claim 1, wherein the step of one of machining and cold heading the outer surface of the truncated forward body portion includes the step of:
forming a plurality of sections around said outer surface of said truncated forward body portion, said sections axially extending from the forward end of said truncated forward body portion and the back end of said truncated forward body portion.

13. The method of claim 12, wherein the plurality of sections are at least one of tapered, frustoconical, generally cylindrical, and arcuate.

14. The method of claim 1, wherein the step of one of machining and cold heading an outer surface of the truncated forward body portion includes the steps of:
forming a bore axially extending inwardly from the forward end of said truncated forward body portion to a bore termination; and
brazing a bit tip into the bore.

15. The method of claim 1, further comprising the steps of:
forming a bore in a forward portion of said truncated forward body portion; and
inserting and retaining a bit tip therein, in one of before and after welding said first planar interface of said body portion to said rear second planar interface of said truncated forward body portion, wherein retaining the bit tip therein includes brazing the bit tip into the bore.

* * * * *